United States Patent
Ramalingam

(10) Patent No.: US 6,845,250 B1
(45) Date of Patent: Jan. 18, 2005

(54) METHOD AND SYSTEM FOR TRANSMITTING MESSAGES IN A COMMUNICATIONS NETWORK

(75) Inventor: Thiyagesan Ramalingam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 838 days.

(21) Appl. No.: 09/687,852

(22) Filed: Oct. 13, 2000

(51) Int. Cl.[7] .............................. H04B 1/38; H04M 1/00
(52) U.S. Cl. .................... 455/560; 455/554.1; 455/445; 370/352; 370/401; 379/212.01; 379/88.17
(58) Field of Search ...................... 485/360, 554.1, 485/448, 453, 458; 370/352, 401, 389, 410, 217; 379/114.02, 212.01, 88.17

(56) References Cited

U.S. PATENT DOCUMENTS

| 6,167,043 | A | 12/2000 | Frantz | 370/356 |
|---|---|---|---|---|
| 6,169,795 | B1 | 1/2001 | Dunn et al. | 379/209 |
| 6,222,829 | B1 | 4/2001 | Karlsson et al. | 370/329 |
| 6,341,128 | B1 | 1/2002 | Svedberg | 370/352 |
| 6,477,494 | B2 | 11/2002 | Hyde-Thomson | 704/260 |
| 6,487,533 | B2 | 11/2002 | Hyde-Thomson et al. | 704/260 |
| 6,512,764 | B1 | 1/2003 | Carew et al. | 370/356 |
| 6,519,252 | B2 | 2/2003 | Sallberg | 370/356 |
| 6,542,503 | B1 * | 4/2003 | Xu et al. | 370/390 |
| 6,584,110 | B1 | 6/2003 | Mizuta et al. | 370/401 |
| 6,594,253 | B1 | 7/2003 | Sallberg et al. | 370/349 |
| 6,600,734 | B1 | 7/2003 | Gernert et al. | 370/352 |
| 6,622,016 | B1 * | 9/2003 | Sladek et al. | 379/201.01 |
| 2002/0016937 | A1 * | 2/2002 | Houh | 714/43 |
| 2003/0133558 | A1 * | 7/2003 | Kung et al. | 379/215.01 |
| 2003/0193933 | A1 * | 10/2003 | Jonas et al. | 370/352 |

* cited by examiner

Primary Examiner—Nick Corsaro
Assistant Examiner—Edan Orgad
(74) Attorney, Agent, or Firm—Baker Botts L.L.P.

(57) ABSTRACT

A method and system for transmitting messages in a communications network is disclosed. A signaling gateway receives a message directed to a destination circuit. The signaling gateway is coupled to multiple voice gateways, including a destination voice gateway coupled to the destination circuit. The signaling gateway determines the destination voice gateway and sends the message to the destination voice gateway.

41 Claims, 2 Drawing Sheets

METHOD AND SYSTEM FOR TRANSMITTING MESSAGES IN A COMMUNICATIONS NETWORK

TECHNICAL FIELD OF THE INVENTION

This invention relates generally to the field of telecommunications and more specifically to a method and system for transmitting messages in a communications network.

BACKGROUND OF THE INVENTION

Messages in a communications network are often routed using a Signaling System 7 (SS7) protocol. Messages sent by a signal transfer point are received by a signaling gateway and routed to a voice gateway coupled to the signaling gateway. The signal transfer point identifies signaling gateways within the network by a point code that is configured in the signaling gateway. Each new voice gateway requires an additional signaling gateway through which messages are routed, and the signal transfer point is then reconfigured to recognize the new signaling gateway. Such reconfiguration, however, is time-consuming and prone to error.

SUMMARY OF THE INVENTION

A method and system for transmitting messages in a communications network is disclosed. A signaling gateway receives a message directed to a destination circuit. Multiple voice gateways, which include a destination voice gateway coupled to the destination circuit, are coupled to the signaling gateway. Circuits, including the destination circuit, are coupled to the voice gateways. The signaling gateway determines the destination voice gateway and sends the message to the destination voice gateway.

A signaling gateway for transmitting a message in a communications network is disclosed. A signaling software stack receives a message directed to a destination circuit, and determines a destination voice gateway coupled to the destination circuit. The destination voice gateway is one of a number of voice gateways coupled to the signaling gateway. A message direction part appends a header to the message. The header includes a voice gateway address that identifies the destination voice gateway.

A technical advantage of one embodiment of the system is that multiple voice gateways are coupled to a single signaling gateway. Additional voice gateways may be coupled to the signaling gateway without adding more signaling gateways. Another technical advantage is that a switch coupled to the signaling gateway does not need to be reconfigured when an additional voice gateway is coupled to the signaling gateway.

Another technical advantage is that backing up the system does not require creating a redundant set of voice gateways coupled to the backup signaling gateway. Instead, a backup signaling gateway may be placed into service using existing voice gateways. Still another technical advantage is that message processing may be distributed from the signaling gateway to the voice gateways, thus reducing processing time in the signaling gateway itself. Other technical advantages will be apparent to one skilled in the art from the following detailed description.

DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
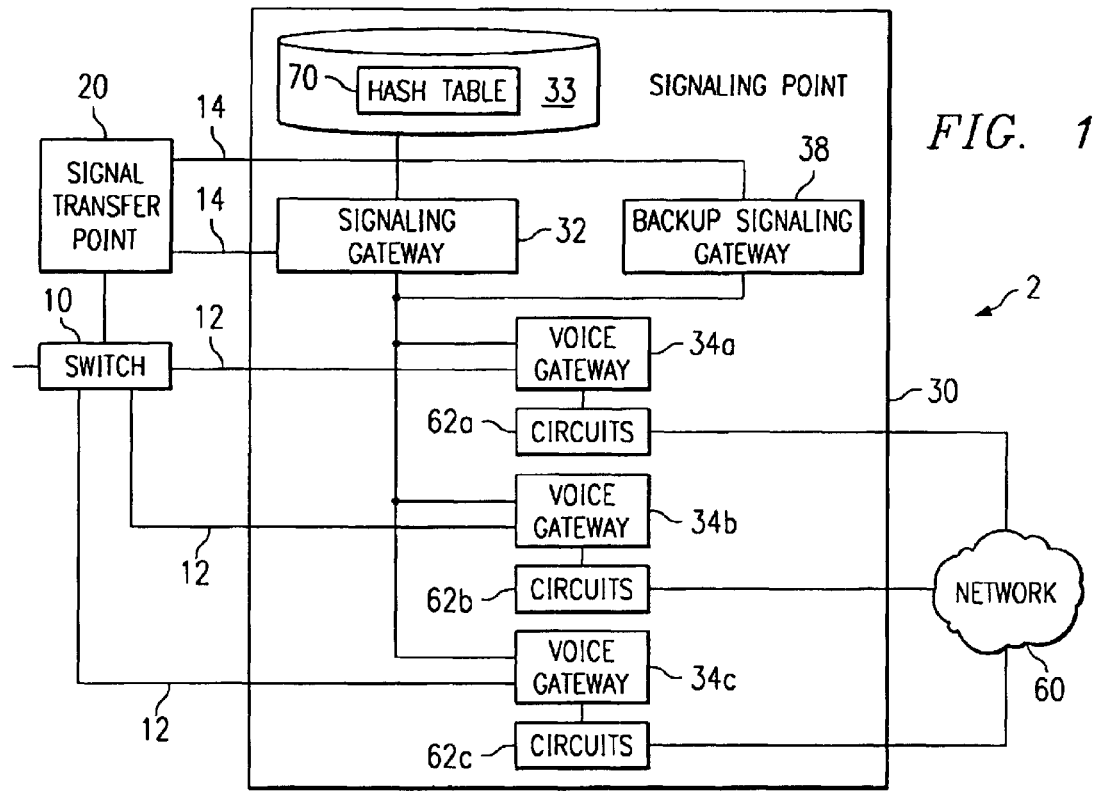
FIG. 1 is a block diagram of one embodiment of a system for transmitting a message in a communications network.

FIG. 1 is a block diagram of one embodiment of a system 2 for transmitting a message in a communications network. System 2 sets up communication sessions and directs signals in the communications network. Communications may include one or a combination of voice, video, audio, data or other communications. Any suitable protocol may be used in system 2. Because Signaling System 7 (SS7) protocol is typically used as a protocol for voice transfer, terms from the SS7 protocol are used in the following description, but it is understood that the invention could apply to equivalent structures using any appropriate protocol that provide services for directing or establishing communications or otherwise manage components in system 2.

A communications network, which includes system 2, includes one or a combination of a public switched telephone network (PSTN), a public/private communications network, a wireline/wireless network, a local, regional, or global communications network, and/or other suitable circuit-switched or packet based communications network. System 2 includes a switch 10, which may be a central office, end office, or other facility providing communications services. Switch 10 is coupled to a signal transfer point (STP) 20, which transfers signaling messages from one signaling link to another. Signal transfer point 20 is coupled to a signaling gateway (SG) 32 through a communication path 14 of the communications network.

Signal transfer point 20 is configured to recognize signaling gateway 32 by assigning a gateway identifier, for example, a 24-bit point code, to signaling gateway 32. Signaling gateway 32 can manage multiple voice gateways 34 so signal transfer point 20 may recognize one point code or equivalent gateway identifier for multiple voice gateways 34. Thus, system 2 is configured in a single point code architecture. It is understood, however, that the depicted embodiment could include more than one signaling point 30, and consequently more than one point code, if desired. The term "single point code architecture" does not mean that there is only one signaling gateway 32 within the signaling network, but rather indicates that multiple voice gateways 34 can be accessed with a single point code.

Signaling gateway 32 is coupled to voice gateways 34. Signaling gateway 32 and voice gateways 34 are known is collectively as a signaling point 30. In general, gateways 32 and 34 intercept and redirect signals from one signaling link to another. Messages may include data, video, audio or other transmittable information. Examples of messages include initial address messages (IAM) to determine whether a circuit 62 is available for transmission, keepalive packets to verify that circuit 62 is active, and release messages to end a connection and free circuit 62 for another connection. In one embodiment, switch 10 is coupled to a communication path 12, for example, a T1 trunk, directly to one of several voice gateways (VGs) 34. Communication path 12 may carry, for example, voice, video, or data messages.

Signaling gateway 32 communicates with voice gateways 34 using a communications protocol. Voice gateways 34 are identified within signaling point 30 by an address appropriate to the communications protocol. For example, if the communications protocol is transmission control protocol/Internet protocol (TCP/IP), the address of each voice gateway 34 is an IP address. Each voice gateway 34 is coupled to a number of circuits 62 that provide a variety of voice, video, and/or data services. "Each" refers to each of a set or each of a subset of the set. Signaling gateway 32 determines which voice gateway 34 is associated with circuits 62 so that a message directed to a particular circuit 62 can be routed to the proper voice gateway 34. A memory 33 coupled to signaling gateway 32 stores a hash table 70 that provides information for determining the voice gateway 34. This recognition and routing process is described in greater detail in conjunction with FIGS. 3 and 4.

In operation, before switch 10 sends messages to a circuit 62, switch 10 verifies that circuit 62 is available to receive messages by sending an initial address message (IAM) to determine whether the circuit 62 is available for connection, or a keepalive packet to verify that circuit 62 is still responding. The initial address message seizes circuit 62 and provides information relating to the handling of the call. After determining availability, switch 10 sends a message. The message includes a header indicating a destination circuit 62 to which the message is directed, which is determined by the destination of the message, for example, a telephone number dialed by a caller. Signal transfer point 20 determines destination circuit 62 and sends the message to signaling gateway 32 associated with destination circuit 62.

Signaling gateway 32 receives the message, determines a destination voice gateway 34 coupled to the destination circuit 62, and sends the message to destination voice gateway 34. Several embodiments allow signaling gateway 32 to perform these tasks. Such embodiments are described in greater detail in conjunction with FIGS. 3 and 4. Voice gateway 34 receives the message, directs the message to the appropriate circuit 62 if possible, and replies to switch 10 if the message invites a response.

One embodiment of the single point code architecture presents several technical advantages. Signal transfer point 20 does not have to be reconfigured every time a new voice gateway 34 is added to signaling point 30 because signaling gateway 32, which is already recognized by signal transfer point 20, can accommodate the added voice gateway 34. The added voice gateway 34, on the other hand, can readily be reprogrammed by simply downloading software from the signaling gateway 32, reducing system failures due to errors in complicated reconfiguration processes. Additionally, system 2 is readily scalable because installing a new voice gateway 34 does not require adding another signaling gateway 32.

Furthermore, a single point code architecture dramatically reduces the complexity of the backup system. Backup systems are crucial for efficient operation of communications networks. In a multi-point code architecture, where each voice gateway requires its own signaling gateway, backing up the system requires complete replication of signaling point 30 as well as reconfiguration of signal transfer point 20 to recognize the backup system. In a single point code architecture, each component does not need to be replicated individually, thus reducing complexity of the backup systems. For example, if signaling gateway 32 fails, a backup signaling gateway 38 can take over by assuming the operations of the original signaling gateway 32 in the communications protocol. Backup signaling gateway 38 does not require redundant voice gateways 34 that go unused when the backup system is not being used. Instead, signaling gateway 32 can simply assume management of existing voice gateways 34. Similarly, a new voice gateway 34 can efficiently be put in place of another voice gateway 34 in the communications protocol if one of the voice gateways 34 fail.

Figure 2:
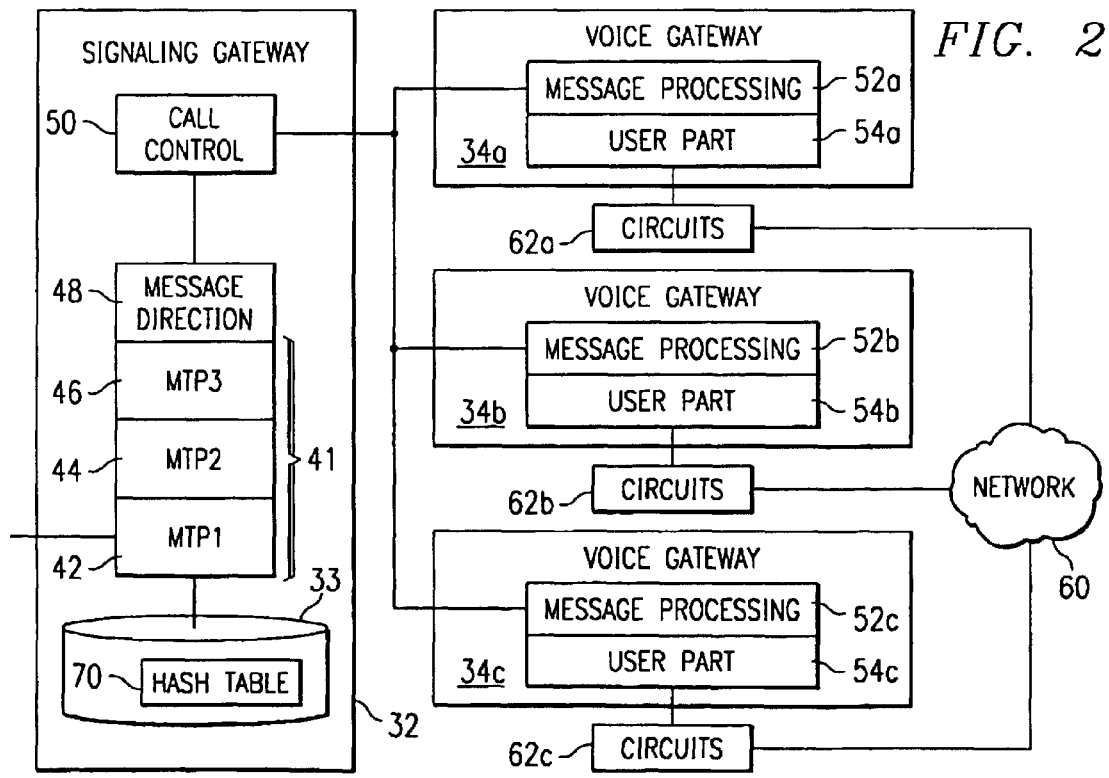
FIG. 2 illustrates one embodiment of message processing between the signaling gateway and the voice gateways of the system of FIG. 1.

FIG. 2 illustrates one embodiment of message processing between signaling gateway 32 and voice gateways 34 of FIG. 1. In one embodiment, a message is typically routed using one or more message transfer parts (MTPs), which provide processing for routing of messages between signaling points. A user protocol, such as an integrated services digital network (ISDN) user part (ISUP), which provides call setup signaling information between signaling points, may also be used. In multi-point code architectures, the signaling gateway executes all of the protocols. That is, message processing is localized at the signaling gateway. System 2, however, contemplates the use of any suitable messaging or signaling protocol. FIG. 2 illustrates how processing is distributed among signaling gateway 32 and voice gateways 34 in a single point code architecture.

In one embodiment, signaling gateway 32 receives a message. Signaling gateway 32 processes the message using a signaling software stack 41. Signaling software stack 41 identifies the destination circuit 62 to which a message is directed, and determines the destination voice gateway 34 coupled to the destination circuit 62. A hash table 70 in memory 33, which is described in connection with FIG. 3, may be used to associate the destination voice gateway 34 with the destination circuit 62.

Signaling software stack 41 typically includes three message transfer parts, MTP1 42, MTP2 44, and MTP3 46. The message terminates on each part, that is, the message arrives at an MTP and is directed to another part. For example, MTP1 42 manages a collection of physical circuits, MTP2 44 manages multiple MTP1s 42, and MTP3 46 manages multiple MTP2s 44. A message arriving from a physical circuit terminates on MTP1 42. MTP1 42 redirects the message to an MTP2 44, and MTP2 44 redirects the message to an MTP3 66. System 2, however, contemplates any level or combination of MTPS.

MTP3 46 of signaling gateway 32 transmits the message to a message direction part 48. Message direction part 48 may append a header to the message, as described in connection with FIG. 4, or may direct the message using a protocol such as signal control transfer protocol (SCTP). SCTP permits the message to be routed by circuit number without having to convert the circuit number to an IP address, thus saving a processing step. The message is sent to call control 50, which routes the message to the appropriate voice gateway 34 in a manner according to the communications protocol.

Voice gateway 34 receives the message and processes the message in a message processing part 52. In message processing part 52, voice gateway 34 may send the message to distribution circuit 62, edit the message to remove a header, generate a responding message for switch 10, or perform other functions relating to the availability of circuits 62 or the transmission of messages to circuits 62. Voice gateway 34 processes the message through a user part 54, for example, an ISDN user part (ISUP). User part 54 may direct setting up, coordinating, and terminating calls in system 2. User part 54 sends the message to a circuit 62.

The division of MTP1 42, MTP2 44, MTP3 46, and user part 54 between signaling gateway 32 and voice gateways 34 demonstrates how standard message processing may be distributed within a single point code architecture. System 2 contemplates any distribution of processing between signaling gateway 32 and voice gateways 34 or all processing at signaling gateway 32 or all processing at voice gateway 34.

Figure 3:
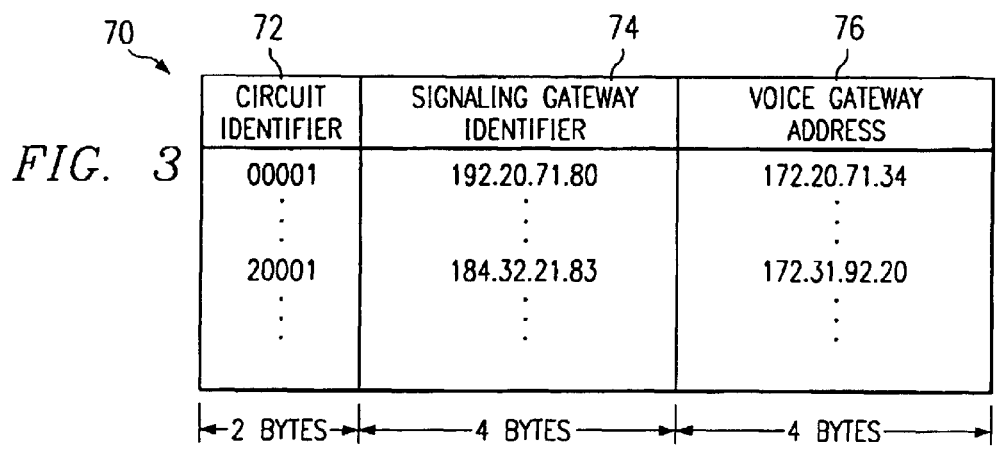
FIG. 3 illustrates one embodiment of a hash table that the signaling gateway of FIG. 1 may use to determine a voice gateway to which a message is directed.
Figure 4:
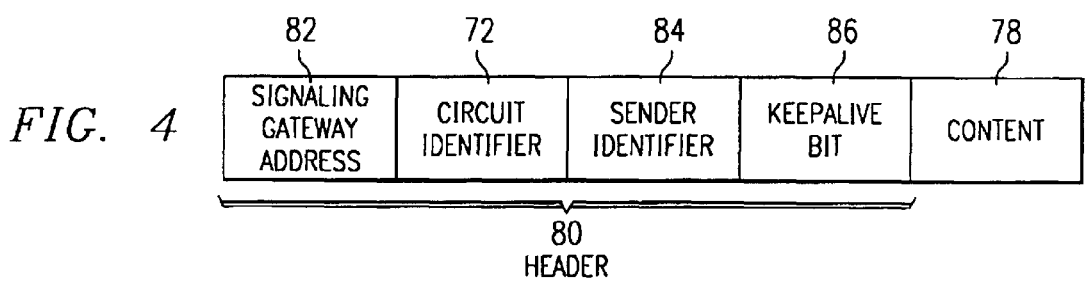
FIG. 4 illustrates one embodiment of a header that may be appended to a message.

FIGS. 3 and 4 illustrate how signaling gateway 32 may interact with multiple voice gateways 34. FIG. 3 illustrates a hash table 70 that signaling gateway 32 may use to determine the particular voice gateway 34 to which a message is directed. FIG. 4 illustrates a header 80 that may be appended to a message directed to a destination voice gateway 34.

In one embodiment, signaling software stack 41 of signaling gateway 32 accesses a hash table 70 stored in memory 33. When signaling gateway 32 receives a message directed to circuit 62, signaling software stock 41 uses hash table 70 to determine the address for the proper destination voice gateway 34 that manages and is coupled to destination circuit 62. Hash table 70 associates a circuit identifier 72 of destination circuit 62 with a voice gateway address 76 of destination voice gateway 34 coupled to destination circuit 62. Circuit identifier 72 may include a circuit number, and a voice gateway address 76 may include an IP address. Hash table 70 also associates circuit identifier 72 with a signaling gateway identifier 74, for example, a point code of a signaling gateway 32 that can access destination circuit 62. Signaling gateway identifier 74 may be used to verify that destination circuit 62 is accessible by the signaling gateway 32 that is processing the message in order to check that the message has been sent to the correct signaling gateway 32.

Once signaling gateway 32 has the proper voice gateway address 76, the message direction part 48 appends header 80, an example is illustrated in FIG. 4, to the message in order to allow the message to be directed by the communications protocol. The message includes content 78 and header 80 that routes the message through system 2. Header 80 includes circuit identifier 72 and signaling gateway address 82. Signaling gateway address 82 may include an IP address of signaling gateway 32.

Header 80 also includes a sender identifier 84 for the sender of the message so that voice gateway 34 can direct responses to the sender using the communications protocol. The sender may include signal transfer point 20 or switch 10. Sender identifier 84 may include a point code for the sender. Header 80 also includes a keepalive bit 86 that instructs voice gateway 34 whether to send a keepalive response to prevent disconnection with switch 10. For example, the signaling-keepalive bit 86 may be set to "zero" if the voice gateway 32 needs to send a keepalive response to the switch 10 to maintain the connection, and "one" if no response is required, or vice versa.

Hash table 70 and headers 80 allow signaling gateway 32 to direct messages to voice gateways 34. Alternative processes may be used. For example, signal control transfer protocol (SCTP), a protocol for transferring messages between IP nodes, may be used to direct messages from signaling gateway 32 to voice gateway 34. SCTP allows messages to be routed by circuit identifier 72 to the voice gateway 34 without translating circuit identifier 72 into an IP address. Alternatively, the communications protocol itself could be tailored to simplify message transfer from signaling gateway 32 to voice gateway 34. For example, the signaling network could use a distributed protocol, such as a Cisco distributed protocol (CDP), that uses a less cumbersome method of node identification than a 4-byte IP address. System 2 contemplates one or a combination of any number of suitable protocols.

Figure 5:
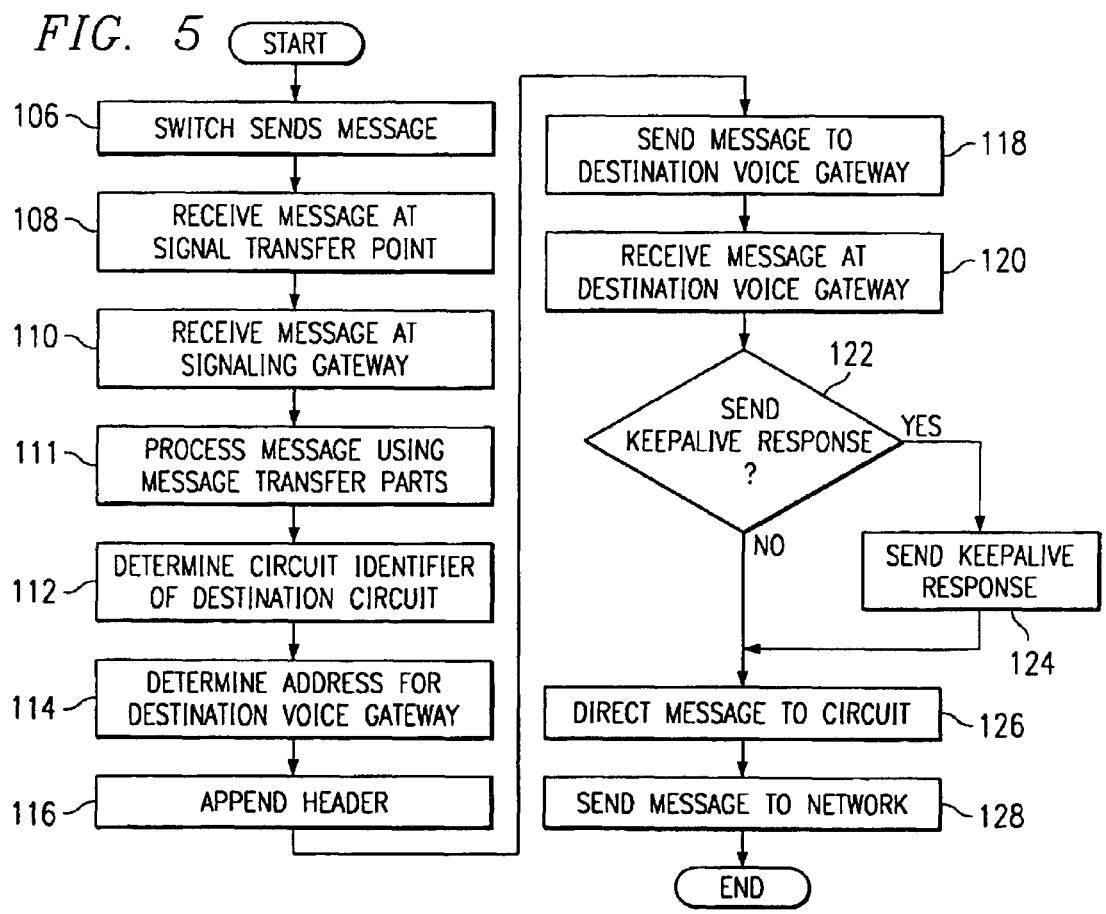
FIG. 5 is a flowchart of one embodiment for a method for transmitting a message through the system of FIG. 1.

FIG. 5 is a flowchart of one embodiment of a method for transmitting a message in a communications network. The method begins at step 106, where switch 10 sends a message to signal transfer point 20. The message includes a header with a circuit identifier 72 of destination circuit 62 to which the message is directed. Signal transfer point 20 receives the message at step 108 and transfers the message to signaling gateway 32. Signaling gateway 32 receives the message at step 110, and processes the message using MTP1 42, MTP2 44, and MTP3 46 at step 111. MTPs 42, 44, and 46 provide processing for routing signaling messages between signaling points.

From the message header, signaling software stack 41 of signaling gateway 32 identifies circuit identifier 72 of destination circuit 62 at step 112. Signaling software stack 41 determines the voice gateway address 76 destination voice gateway 34 that manages destination circuit 62 at step 114. Signaling software stack 41 may look up voice gateway address 76 using hash table 70 that associates circuit identifier 72 with voice gateway address 76. Message direction part 48 appends header 80 to the message at step 116. Header 80 includes circuit identifier 72 of destination circuit 62, signaling gateway address 82, sender identifier 84, and keepalive bit 86. After header 80 is appended, call control 50 routes the message to destination voice gateway 34 at step 118. Call control 50 may use TCP/IP communication protocol to send the message.

Destination voice gateway 34 receives the message at step 120. At step 122, destination voice gateway 34 determines whether a keepalive response is required in order to maintain the communication link based on the value assigned to keepalive bit 86. For example, keepalive bit 86 is "zero" if a keepalive response is required and "one" if a keepalive response is not required. If a keepalive response is required at step 122, the method proceeds to step 124, where voice gateway 34 sends a keepalive response to signaling gateway 32. The method then proceeds to step 126. If a keepalive response is not required at step 122, the method proceeds directly to step 126.

At step 126, voice gateway 34 directs the message to destination circuit 62. Voice gateway 34 may perform additional processing, for example, generating a response to the message or other processing appropriate to the message. Destination circuit 62 sends the message to external network 60 at step 128. After the message is sent, the method terminates.

A signaling network for telecommunications employing a single point code architecture overcomes drawbacks associated with multi-point code architectures. At the same time, it is easily adaptable to use in telecommunications systems. Although embodiments of the invention and its advantages are described in detail, a person skilled in the art could make various alterations, additions, and omissions without departing from the spirit and scope of the present invention as defined by the appended claims.

What is claimed is:

1. A system for transmitting a message in a communications network, the system comprising:
 a signaling gateway operable to:
  receive a message directed to a destination circuit; and
  execute one or more message transfer parts;

a plurality of voice gateways coupled to the signaling gateway, the voice gateways comprising a destination voice gateway coupled to the destination circuit, each message transfer part of the one or more message transfer parts being operable to direct the message to at least one of the voice gateways, at least one of the voice gateways being operable to execute an integrated services digital network user part; and a plurality of circuits comprising the destination circuit, each circuit coupled to at least one of the voice gateways, the integrated services digital network user part of the at least one voice gateway being operable to provide signaling information to a circuit of the circuits, the signaling gateway being farther operable to:

establish the destination circuit from the message;

determine a circuit identifier identifying the destination circuit;

determine the destination voice gateway based on the circuit identifier identifying the destination circuit; and send the message to the destination voice gateway.

2. The system of claim 1, wherein:

the destination voice gateway is associated with an Internet protocol address; and the signaling gateway is operable to:

associate the destination circuit with the Internet protocol address; and send the message to the destination voice gateway by using the Internet protocol address.

3. The system of claim 1, further comprising a hash table associating a circuit with a voice gateway coupled to the circuit, wherein the signaling gateway is operable to determine the destination voice gateway by using the hash table.

4. The system of claim 1, further comprising a hash table associating the signaling gateway with the destination circuit, wherein the signaling gateway is operable to determine that the message is at the appropriate signaling gateway by using the hash table.

5. The system of claim 1, further comprising a message direction part operable to append a header to the message, the header comprising an address associated with the signaling gateway and a circuit identifier associated with the destination circuit.

6. The system of claim 5, wherein the header comprises a sender identifier identifying a sender of the message.

7. The system of claim 1, wherein the message comprises data information.

8. The system of claim 1, wherein the message comprises video information.

9. A method for transmitting a message in a communications network, the method comprising:

receiving a message at a signaling gateway coupled to a plurality of voice gateways, the message directed to a destination circuit of a plurality of circuits;

determining a destination voice gateway coupled to the destination circuit, the voice gateways comprising the destination voice gateway, the destination voice gateway determined by the signaling gateway by:

establishing the destination circuit from the message;

determining a circuit identifier identifying the destination circuit; and determining the destination voice gateway based on the circuit identifier identifying the destination circuit;

executing, at the signaling gateway, a message transfer part of one or more message transfer parts, each message transfer part being operable to direct the message to at least one of the voice gateways;

communicating the message to the destination voice gateway; and executing, at the destination voice gateway, an integrated services digital network user part, the integrated services digital network user part operable to provide signaling information to the destination circuit.

10. The method of claim 9, further comprising:

associating the destination circuit with an Internet protocol address identifying the destination voice gateway; and communicating the message to the destination voice gateway by using the Internet protocol address.

11. The method of claim 9, further comprising:

associating a circuit with a voice gateway using a hash table, the circuit coupled to the voice gateway; and determining the destination voice gateway by using the hash table.

12. The method of claim 9, further comprising:

associating the signaling gateway with the destination circuit using a hash table; and determining that the message is at the appropriate signaling gateway by using the hash table.

13. The method of claim 9, further comprising appending a header to the message, the header comprising an address associated with the signaling gateway and a circuit identifier associated with the destination circuit.

14. The method of claim 13, wherein the header comprises a sender identifier identifying a sender of the message.

15. The method of claim 9, wherein the message comprises data information.

16. The method of claim 9, wherein the message comprises video information.

17. A signaling gateway for transmitting a message in a communications network, the signaling gateway comprising:

a signaling software stack operable to:

receive a message directed to a destination circuit of a plurality of circuits, and determine a destination voice gateway operable to communicate the message to the destination circuit, the destination voice gateway one of a plurality of voice gateways coupled to the signaling gateway, at least one of the voice gateways being operable to execute an integrated services digital network user part, the integrated services digital network user part of the at least one voice gateway being operable to provide signaling information to a circuit of the circuits, the destination voice gateway determined by:

establishing the destination circuit from the message;

determining a circuit identifier identifying the destination circuit; and determining the destination voice gateway based on the circuit identifier identifying the destination circuit;

one or more message transfer parts executable by the signaling gateway, each message transfer part of the one or more message transfer parts being operable to direct the message to at least one of the voice gateways; and a message direction part operable to append a header to the message, the header comprising a voice gateway address identifying the destination voice gateway.

18. The signaling gateway of claim 17, wherein:
the destination voice gateway is associated with an Internet protocol address; and
the header comprises the Internet protocol address.

19. The signaling gateway of claim 17, further comprising a hash table associating a circuit with a voice gateway coupled to the circuit, wherein the signaling software stack is operable to determine the destination voice gateway by using the hash table.

20. The signaling gateway of claim 17, further comprising a hash table associating the signaling gateway with the destination circuit, wherein the signaling software stack is operable to determine that the message is at the appropriate signaling gateway by using the hash table.

21. The signaling gateway of claim 17, wherein the header comprises a circuit identifier associated with the destination circuit.

22. The signaling gateway of claim 17, wherein the header comprises a sender identifier identifying a sender of the message.

23. The signaling gateway of claim 17, wherein the message comprises data information.

24. The signaling gateway of claim 17, wherein the message comprises video information.

25. A system for transmitting a message in a communications network, the system comprising:
means for receiving a message at a signaling gateway coupled to a plurality of voice gateways, the message directed to a destination circuit of a plurality of circuits;
means for determining a destination voice gateway coupled to the destination circuit, the voice gateways comprising the destination voice gateway, the destination voice gateway determined by the signaling gateway by:
establishing the destination circuit from the message;
determining a circuit identifier identifying the destination circuit; and
determining the destination voice gateway based on the circuit identifier identifying the destination circuit; and
means for executing, at the signaling gateway, a message transfer part of one or more message transfer parts, each message transfer part being operable to direct the message to at least one of the voice gateways;
means for communicating the message to the destination voice gateway; and
means for executing, at the destination voice gateway, an integrated services digital network user part, the integrated services digital network user part operable to provide signaling information to the destination circuit.

26. The system of claim 25, further comprising:
means for associating the destination circuit with an Internet protocol address identifying the destination voice gateway; and
means for communicating the message to the destination voice gateway by using the Internet protocol address.

27. The system of claim 25, further comprising:
means for associating a circuit with a voice gateway using a hash table, the circuit coupled to the voice gateway; and
means for determining the destination voice gateway by using the hash table.

28. The system of claim 25, further comprising:
means for associating the signaling gateway with the destination circuit using a hash table; and
means for determining that the message is at the appropriate signaling gateway by using the hash table.

29. The system of claim 25, further comprising means for appending a header to the message, the header comprising an address associated with the signaling gateway and a circuit identifier associated with the destination circuit.

30. The system of claim 29, wherein the header comprises a sender identifier identifying a sender of the message.

31. The system of claim 25, wherein the message comprises data information.

32. The system of claim 25, wherein the message comprises video information.

33. Signaling software embodied in a computer-readable medium and operable to perform the following:
receiving a message at a signaling gateway coupled to a plurality of voice gateways, the message directed to a destination circuit of a plurality of circuits;
determining a destination voice gateway coupled to the destination circuit, the voice gateways comprising the destination voice gateway, the destination voice gateway determined by the signaling gateway by:
establishing the destination circuit from the message;
determining a circuit identifier identifying the destination circuit; and
determining the destination voice gateway based on the circuit identifier identifying the destination circuit;
executing, at the signaling gateway, a message transfer part of one or more message transfer parts, each message transfer part being operable to direct the message to at least one of the voice gateways; and
communicating the message to the destination voice gateway; and
executing, at the destination voice gateway, an integrated services digital network user part, the integrated services digital network user part operable to provide signaling information to the destination circuit.

34. The signaling software of claim 33, further operable to:
associate the destination circuit with an Internet protocol address identifying the destination voice gateway; and
communicate the message to the destination voice gateway by using the Internet protocol address.

35. The signaling software of claim 33, further operable to:
associate a circuit with a voice gateway using a hash table, the circuit coupled to the voice gateway; and
determine the destination voice gateway by using the hash table.

36. The signaling software of claim 33, further operable to:
associate the signaling gateway with the destination circuit using a hash table; and
determine that the message is at the appropriate signaling gateway by using the hash table.

37. The signaling software of claim 33, further operable to append a header to the message, the header comprising an address associated with the signaling gateway and a circuit identifier associated with the destination circuit.

38. The signaling software of claim 37, wherein the header comprises a sender identifier identifying a sender of the message.

39. The signaling software of claim 33, wherein the message comprises data information.

40. The signaling software of claim 33, wherein the message comprises video information.

41. A system for transmitting a message in a communications network, the system comprising:

- a signaling gateway operable to receive a message directed to a destination circuit;
- a plurality of voice gateways coupled to the signaling gateway, the voice gateways comprising a destination voice gateway coupled to the destination circuit, the voice gateways operable to execute an integrated services digital network user part, the integrated services digital network user part operable to provide signaling information to a circuit; and
- a hash table associating the destination circuit with the destination voice gateway, the hash table associating the signaling gateway with the destination circuit;
- a plurality of circuits comprising the destination circuit, each circuit coupled to at least one of the voice gateways, wherein the signaling gateway is operable to:
  - execute one or more message transfer parts, each message transfer part operable to direct the message to at least one of the voice gateways;
  - determine the destination voice gateway by using the hash table;
  - determine that the message is at the appropriate signaling gateway by using the hash table;
  - associate the destination circuit with an Internet protocol address identifying the destination voice gateway;
  - append a header to the message, the header comprising an address associated with the signaling gateway, a circuit identifier associated with the destination circuit, and a sender identifier identifying a sender of the message; and
  - send the message to the destination voice gateway.

* * * * *

UNITED STATES PATENT AND TRADEMARK OFFICE
CERTIFICATE OF CORRECTION

PATENT NO. : 6,845,250 B1
DATED : January 18, 2005
INVENTOR(S) : Ramalingam

It is certified that error appears in the above-identified patent and that said Letters Patent is hereby corrected as shown below:

Column 7,
Line 14, after "being" delete "farther" and insert -- further --.

Signed and Sealed this

Twenty-first Day of March, 2006

JON W. DUDAS
*Director of the United States Patent and Trademark Office*